(12) United States Patent
Le et al.

(10) Patent No.: US 10,000,186 B2
(45) Date of Patent: Jun. 19, 2018

(54) BELT ASSEMBLY INCLUDING PLUS-TWO-POINT BELT REMINDER

(71) Applicant: Ford Global Technologies, LLC, Dearborn, MI (US)

(72) Inventors: Jialiang Le, Canton, MI (US); Manoharprasad K. Rao, Novi, MI (US); Raed Essa El-Jawahri, Northville, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/274,459

(22) Filed: Sep. 23, 2016

(65) Prior Publication Data

US 2017/0291576 A1    Oct. 12, 2017

Related U.S. Application Data

(63) Continuation-in-part of application No. 15/095,355, filed on Apr. 11, 2016.

(51) Int. Cl.
*B60R 22/48* (2006.01)
*B60R 22/12* (2006.01)

(52) U.S. Cl.
CPC ............. *B60R 22/48* (2013.01); *B60R 22/12* (2013.01); *B60R 2022/4825* (2013.01); *B60R 2022/4858* (2013.01); *B60R 2022/4866* (2013.01)

(58) Field of Classification Search
CPC . B60R 22/48; B60R 22/12; B60R 2022/4825; B60R 2022/4858;

(Continued)

(56) References Cited

U.S. PATENT DOCUMENTS

| 4,346,778 A | * | 8/1982 | Bluggel | ................. B60R 22/34 180/268 |
| 4,747,215 A | | 5/1988 | Waikas | |

(Continued)

FOREIGN PATENT DOCUMENTS

| CN | 103010152 A | 4/2013 |
| CN | 105083209 A | 11/2015 |

(Continued)

OTHER PUBLICATIONS

Ponticel, Patrick, No one gets the cold shoulder with Autoliv's two-point seatbelt, May 9, 2012, http://articles.sae.org/11023/ (1 page).

(Continued)

*Primary Examiner* — Nay Tun
(74) *Attorney, Agent, or Firm* — Frank A. MacKenzie; Bejin Bieneman PLC

(57) ABSTRACT

A plus-two-point belt system is disclosed. The plus-two-point belt system includes a longitudinal webbing anchored at a first end to a seat and fixed at a second end to a retractor. The webbing is extendable from the retractor to allow an occupant to slip their arm under the webbing to provide a supplemental restraint. The webbing includes first and second portions where the second portion is retractably coiled on the retractor and the second portion has at least one conductive marker. A sensor is provided to sense the marker and a processor is provided to set an alarm when the marker is not detected.

16 Claims, 12 Drawing Sheets

(58) Field of Classification Search
CPC .... B60R 2022/4866; B60R 2022/4808; B60R 2022/4816; B60R 2022/485; B60R 21/01544; B60K 2028/003; B60K 28/02
See application file for complete search history.

(56) References Cited

U.S. PATENT DOCUMENTS

| | | | |
|---|---|---|---|
| 4,885,566 A | 12/1989 | Aoki et al. | |
| 5,141,249 A | 8/1992 | Saitoh et al. | |
| 5,413,378 A * | 5/1995 | Steffens, Jr. | B60R 21/013 180/268 |
| 5,433,014 A | 7/1995 | Falk et al. | |
| 5,454,591 A * | 10/1995 | Mazur | B60N 2/2806 180/273 |
| 5,653,504 A * | 8/1997 | Henson | B60N 2/3084 297/238 |
| 5,709,408 A | 1/1998 | Carraway, Jr. | |
| 5,906,393 A * | 5/1999 | Mazur | G01G 19/4142 180/268 |
| 6,203,059 B1 * | 3/2001 | Mazur | B60R 22/48 280/735 |
| 6,439,333 B2 | 8/2002 | Domens | |
| 6,448,907 B1 | 9/2002 | Naclerio | |
| 6,581,960 B1 | 6/2003 | Schondorf et al. | |
| 6,616,186 B1 | 9/2003 | Midorikawa | |
| 6,869,105 B2 | 3/2005 | Cheng | |
| 7,163,075 B2 | 1/2007 | Gray | |
| 7,306,261 B2 | 12/2007 | Nomura | |
| 7,419,026 B2 | 9/2008 | Midorikawa | |
| 7,576,642 B2 | 8/2009 | Rodemer | |
| 7,735,766 B2 | 6/2010 | Nomura | |
| 8,095,274 B2 | 1/2012 | Burkhardtsmaier | |
| 8,195,365 B2 * | 6/2012 | Bernhagen | B60R 22/48 280/801.1 |
| 8,302,995 B2 | 11/2012 | Xu et al. | |
| 8,303,043 B2 | 11/2012 | Humbert | |
| 9,434,349 B1 | 9/2016 | Perkins et al. | |
| 2002/0063009 A1 | 5/2002 | Oyaski | |
| 2004/0036270 A1 | 2/2004 | Roychoudhury et al. | |
| 2004/0135360 A1 | 7/2004 | Stanley | |
| 2004/0160339 A1 * | 8/2004 | Yamanoi | B60R 22/48 340/870.09 |
| 2005/0206152 A1 | 9/2005 | Delventhal et al. | |
| 2006/0095184 A1 | 5/2006 | Gray et al. | |
| 2006/0119091 A1 | 6/2006 | Takao et al. | |
| 2007/0216214 A1 | 9/2007 | Delventhal et al. | |
| 2008/0094195 A1 | 4/2008 | Odate | |
| 2009/0112408 A1 | 4/2009 | Kankanala et al. | |
| 2009/0267339 A1 * | 10/2009 | Usoro | B60R 22/4676 280/807 |
| 2009/0303065 A1 | 12/2009 | Lipowski | |
| 2010/0114436 A1 * | 5/2010 | Bernhagen | B60R 22/48 701/45 |
| 2013/0073148 A1 | 3/2013 | Dolan et al. | |
| 2013/0328296 A1 | 12/2013 | Burkhardtsmaier et al. | |
| 2015/0265200 A1 | 9/2015 | Mandi et al. | |
| 2015/0360643 A1 * | 12/2015 | Cech | B60R 22/48 297/217.3 |
| 2016/0059818 A1 * | 3/2016 | Witt | B60R 21/18 280/741 |
| 2016/0159320 A1 * | 6/2016 | Andreen | B60R 22/48 382/103 |
| 2016/0347278 A1 * | 12/2016 | Bibbs, Jr. | B60Q 9/00 |
| 2017/0028965 A1 | 2/2017 | Ohno et al. | |
| 2017/0144625 A1 | 5/2017 | Le et al. | |
| 2017/0291576 A1 | 10/2017 | Le | |

FOREIGN PATENT DOCUMENTS

| | | |
|---|---|---|
| CN | 204937070 U | 1/2016 |
| CN | 205059529 U | 3/2016 |
| DE | 19909001272 U1 | 4/1990 |
| DE | 102004055396 A1 | 5/2006 |
| DE | 102010002186 A1 | 8/2011 |
| DE | 102010045416 A1 | 3/2012 |
| EP | 1116633 A2 | 7/2001 |
| EP | 2108550 A1 | 10/2009 |
| EP | 2653354 A1 | 10/2013 |
| GB | 2414442 A | 11/2005 |
| JP | 2000211476 A | 8/2000 |
| JP | 2009057019 A | 3/2009 |
| JP | 2016005948 A | 1/2016 |
| KR | 101266117 B1 | 5/2013 |
| WO | 9214986 A1 | 9/1992 |
| WO | 2006053600 A1 | 5/2006 |
| WO | 2007065607 A1 | 6/2007 |

OTHER PUBLICATIONS

UKIPO Search Report under Section 17(5) for Application No. GB1704557.6 dated Jul. 20, 2017 (7 pages).
Notice of Allowance dated Oct. 26, 2017 for U.S. Appl. No. 15/274,586 (35 pages).
Search Report dated Feb. 21, 2018 re GB Appl. No. 1715074.9.
Non-Final Office Action for U.S. Appl. No. 15/095,355 dated Jan. 23, 2018 (7 pages).
UK Search Report dated Feb. 21, 2018 re GB Appl. No. 1715106.9.

* cited by examiner

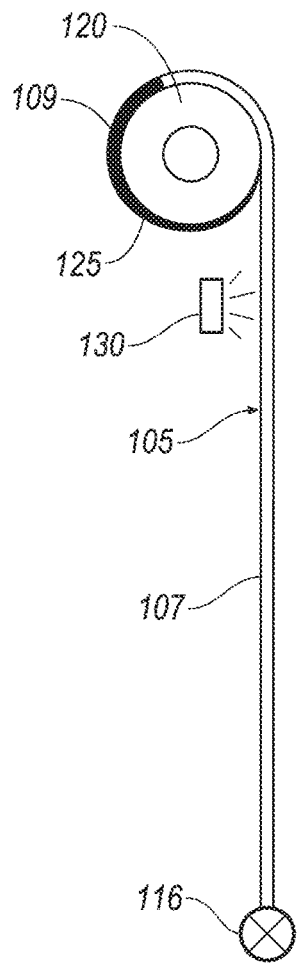
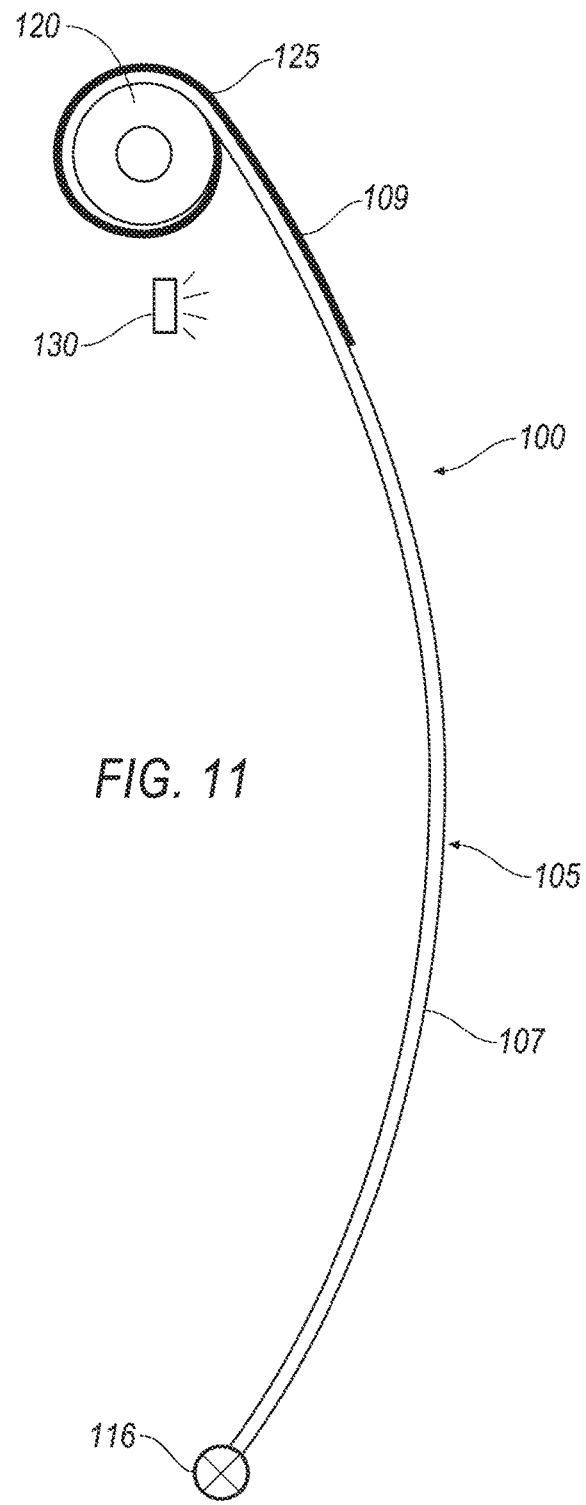
FIG. 10
FIG. 11

BELT ASSEMBLY INCLUDING PLUS-TWO-POINT BELT REMINDER

CROSS-REFERENCE TO RELATED APPLICATIONS

This patent application is a continuation-in-part of and claims priority to and all advantages of U.S. patent application Ser. No. 15/095,355 filed on Apr. 11, 2016, which is herein incorporated by reference in its entirety.

BACKGROUND

Various systems in a vehicle may adjust performance based on a classification of an occupant based on the size, weight, etc., of the occupant. For example, operation of an airbag assembly may be adjusted, e.g., inflation time, inflation pressure, venting/tethering, etc., during a vehicle impact based on the classification of the occupant. As another example, operation of a belt assembly, e.g., pre-tensioning, locking, load limiting, etc., may be adjusted based on the classification of the occupant. There remains an opportunity to design a measurement system to collect information about the occupant.

Plus-two-point belt, or alternately termed, "backpack belts" have been proposed as a supplement to a traditional three-point belt system. There is a need to improve such plus-two-point belt systems.

BRIEF DESCRIPTION OF THE DRAWINGS

FIG. 10 is a plan view of a plus-two-point belt system with an exposed first portion and a coiled second portion.

FIG. 11 is a plan view of the plus-two-point belt system of FIG. 10 with the second portion uncoiled.

DETAILED DESCRIPTION

Figure 1:
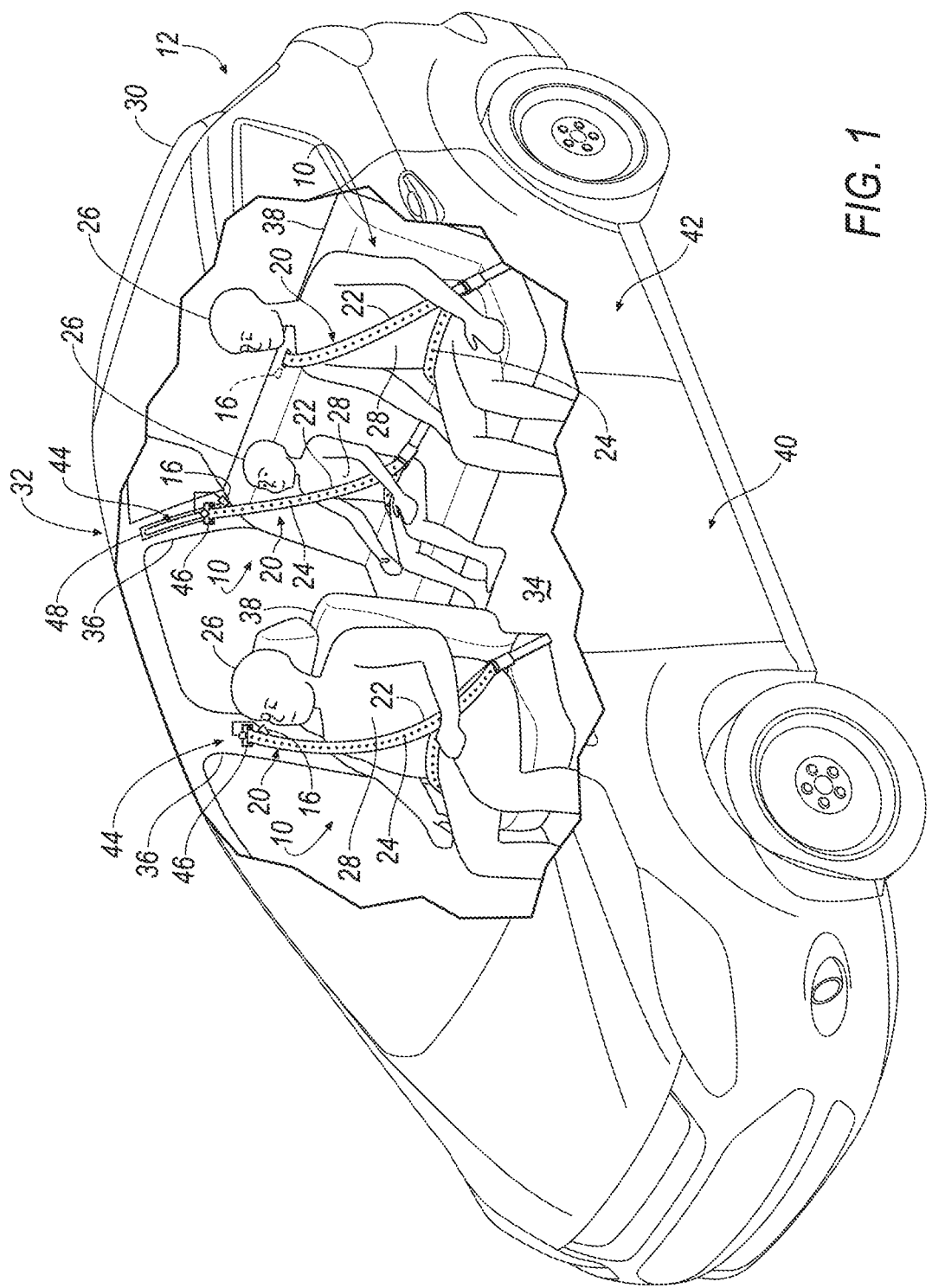
FIG. 1 is a perspective view of a vehicle including a plurality of belt assemblies.
Figure 2:
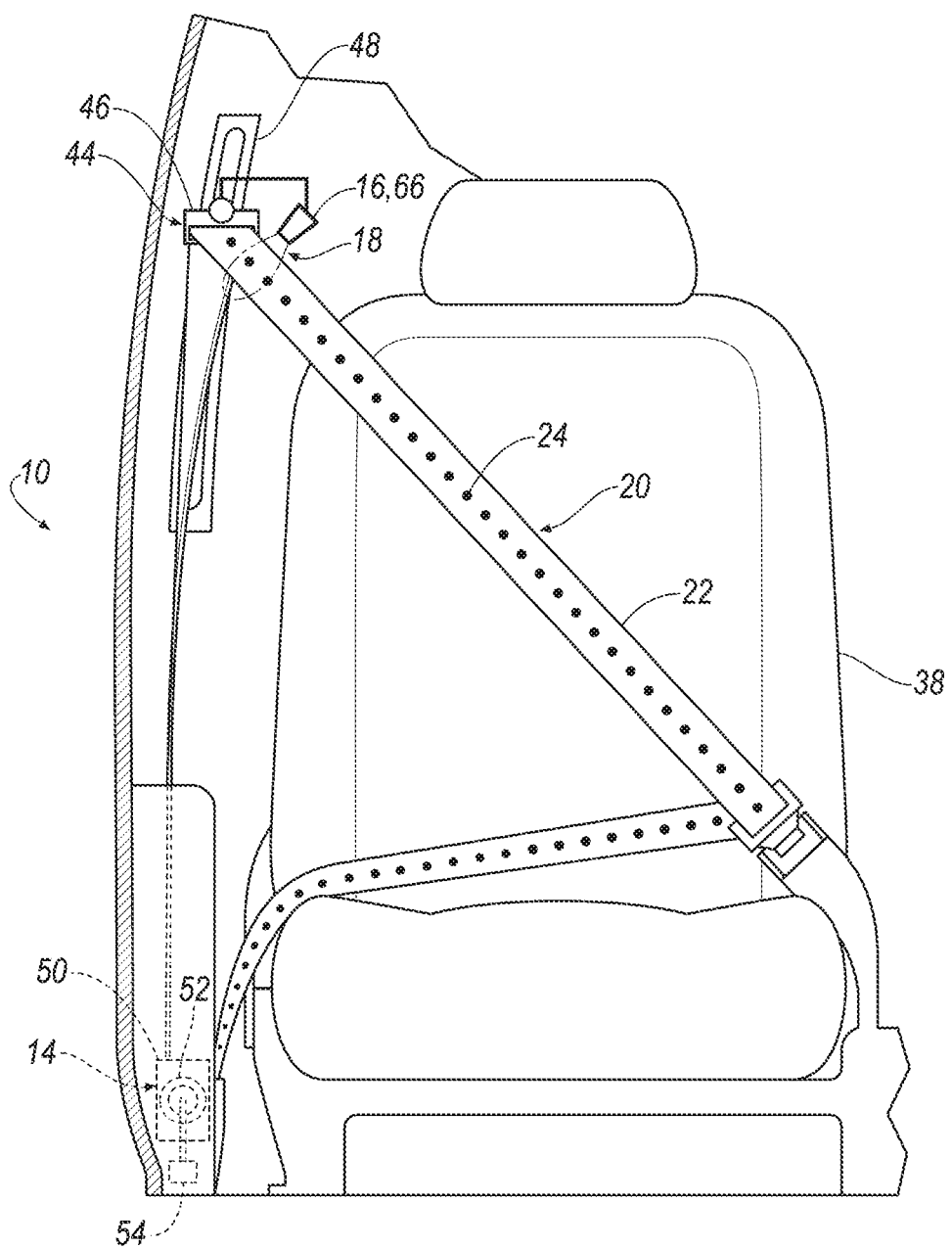
FIG. 2 is the perspective view of a portion of the vehicle including one belt assembly including a track.

With reference to the Figures, wherein like numerals indicate like parts throughout the several views, a belt assembly 10 for a vehicle 12 includes a belt retractor 14, a sensor 16 having a detection field 18, and a belt 20 retractably payable from the belt retractor 14 through the detection field 18. As shown in FIGS. 1 and 2, the belt 20 has a webbing 22 and a plurality of markers 24 fixed to the webbing 22. The webbing 22 has a longitudinal length and the markers 24 are equally spaced along the longitudinal length of the webbing 22, as shown with a distance D in FIG. 3 and FIG. 4A-B.

The sensor 16 of the belt assembly 10 determines the length of the webbing 22 paid out of the belt retractor 14. As shown belt assembly 10 may be described as a three-point belt system. The size of an occupant 26, e.g., the torso 28 of the occupant 26, may be determined based on the length of the webbing 22 paid out by the belt retractor 14, when the belt 20 fastened. The occupant 26 of the vehicle 12 may be classified based at least on the size of the occupant 26. Various systems in a vehicle 12 may adjust performance based on the classification of the occupant 26. For example, operation of an airbag assembly (not shown) of the vehicle 12 may be adjusted, e.g., inflation time, inflation pressure, venting/tethering, etc., during a vehicle impact based on the classification of the occupant 26. As another example, operation of the belt assembly 10, e.g., pre-tensioning, locking, load limiting, etc., may be adjusted based on the classification of the occupant 26.

As shown in FIG. 1, the vehicle 12 may include a vehicle body 30 including a roof 32, a floor 34, and a plurality of pillars 36. The vehicle body 30 may have a uni-body construction, a body-on-frame construction, or any other suitable construction.

The vehicle 12 may include one or more seats 38. For example, as shown in Figures, the vehicle 12 may include a plurality of seats 38. As shown in FIG. 1, the vehicle 12 may include a plurality of belt assemblies 10 disposed adjacent the seats 38, respectively.

The seats 38 may be supported by the floor 34. Alternatively, the seats 38 may be supported by the pillars 36. The seats 38 may be arranged in any suitable arrangement. For example, as shown in the Figures, the seats 38 may be arranged in a front row 40 and a rear row 42. A seat 38 may be, for example, a bucket seat, a bench seat, a child seat, a booster seat, or any other suitable type of seat. The seats 38 may be mounted in a fixed position to the floor 34 as shown in FIG. 1. Alternatively, the seats 38 may be moveable relative to the floor 34, e.g., in a vehicle fore-and-aft direction and/or a cross-vehicle direction.

The belt assembly 10 may include an anchor point 44 spaced from the belt retractor 14 and slideably receiving the webbing 22. The anchor point 44 may position the belt 20 to restrain the torso 28 of the occupant 26 during the vehicle impact. The belt 20 may be mounted at three points, as shown in FIG. 1, or it may be mounted at two or four points. The anchor point 44 may, for example, include a D-ring 46 that slideably receives the webbing 22. The anchor point 44 may be mounted to the pillar 36, or the roof 32, e.g., for a middle seat of the vehicle 12. Alternatively the anchor point 44 may be fixed to a seatback of the seat (not shown).

Figure 9:
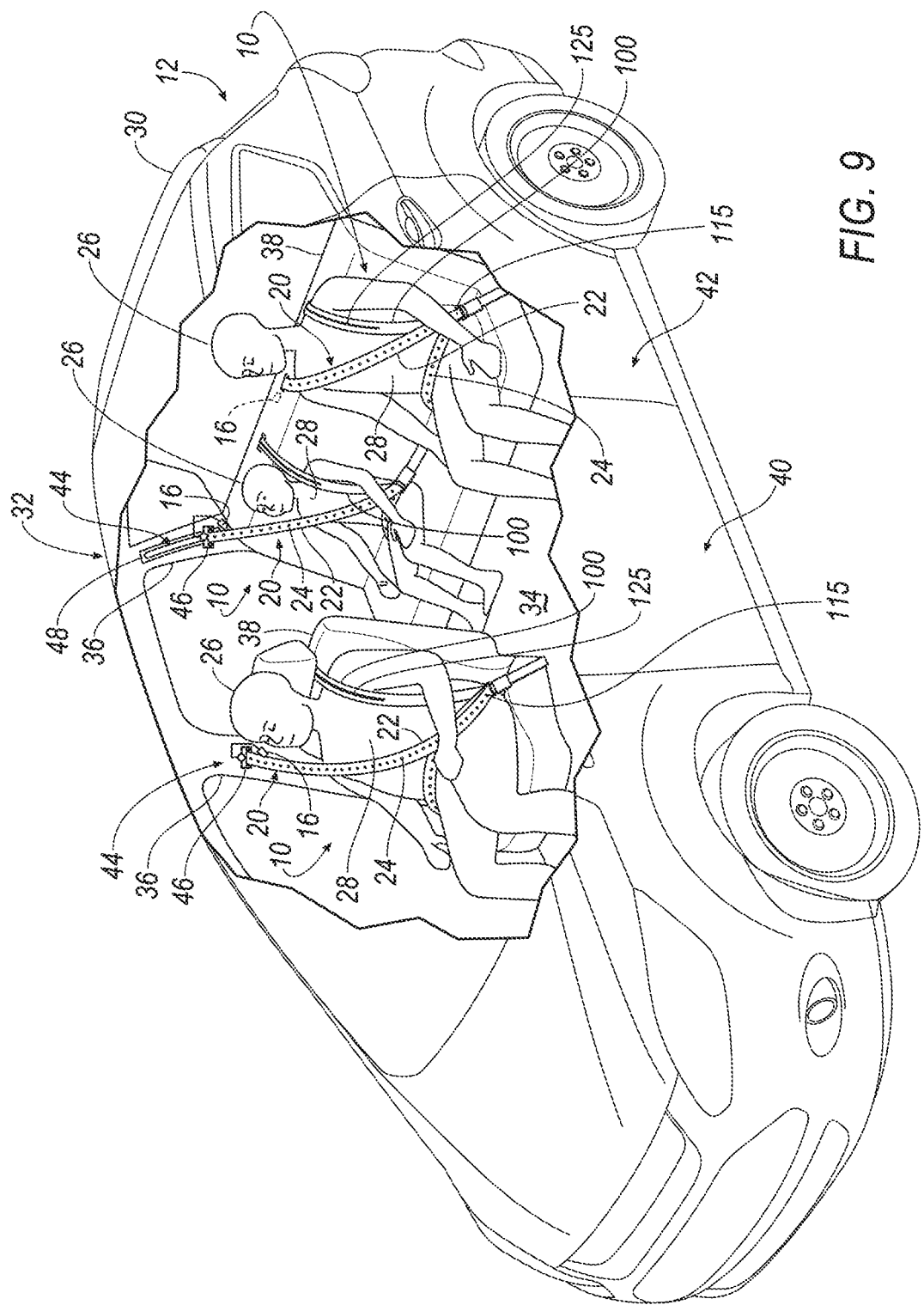
FIG. 9 is a perspective view of the vehicle of FIG. 1 also showing a plurality of plus-two-point belt systems.

As shown in FIG. 9, the anchor point 44 may be adjustably mounted to the pillar 36. Accordingly, the anchor point 44 may be adjustable to accommodate height and size differences of the occupant 26. With continued reference to FIG. 9, the belt assembly 10 may include a track 48 fixed relative to the pillar 36 and the belt retractor 14, and the anchor point 44 may be releasably lockable to the track 48 at fixed points along the track 48. Thus, the anchor point 44 may be released from a fixed point of the track 48 and locked in another fixed point of the track 48 to adjust the position of the anchor point 44 on the track 48.

Figure 6:
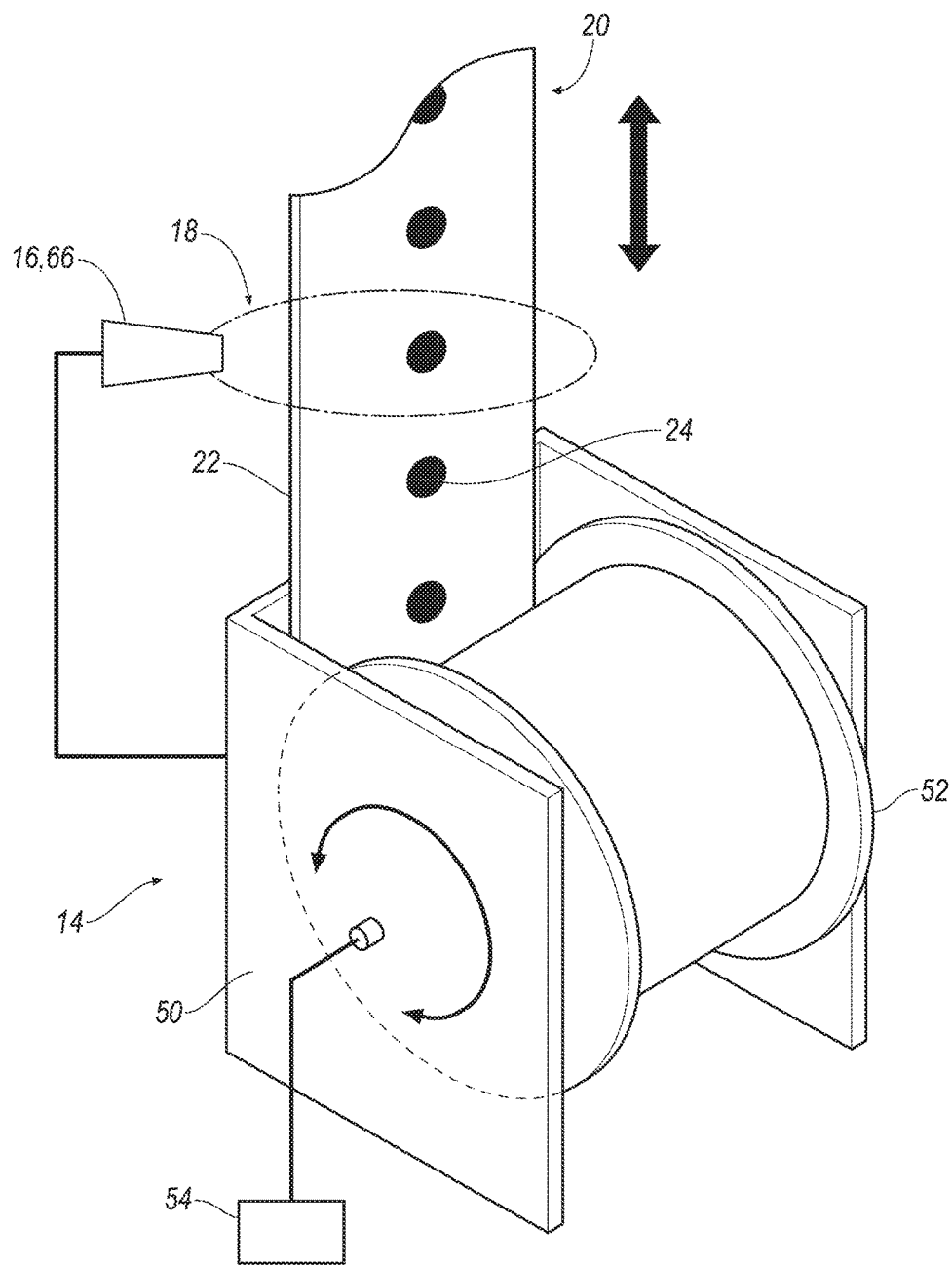
FIG. 6 is the perspective view of a belt retractor including the second sensor.

As shown in FIG. 6, the belt retractor 14 may include a housing 50 and a spool 52 receiving the belt 20 in the housing 50. The housing 50 of the belt retractor 14 may be fixed to the pillar 36, the floor 34 or any other suitable position. The belt 20 may be coiled or uncoiled around the spool 52 as the belt 20 moves into or out of the belt retractor 14 respectively.

The belt assembly 10 may include a second sensor 54 programmed to sense a direction of a movement of the belt 20 into and out of the belt retractor 14. The second sensor 54 may, for example, be fixed to the spool 52 or the housing 50. As one example, the second sensor 54 may sense rotational direction of the spool 52 relative to the housing 50. The second sensor 54 may be a mechanical, magnetic, inductive, optical, or another type of sensor.

Figure 5:
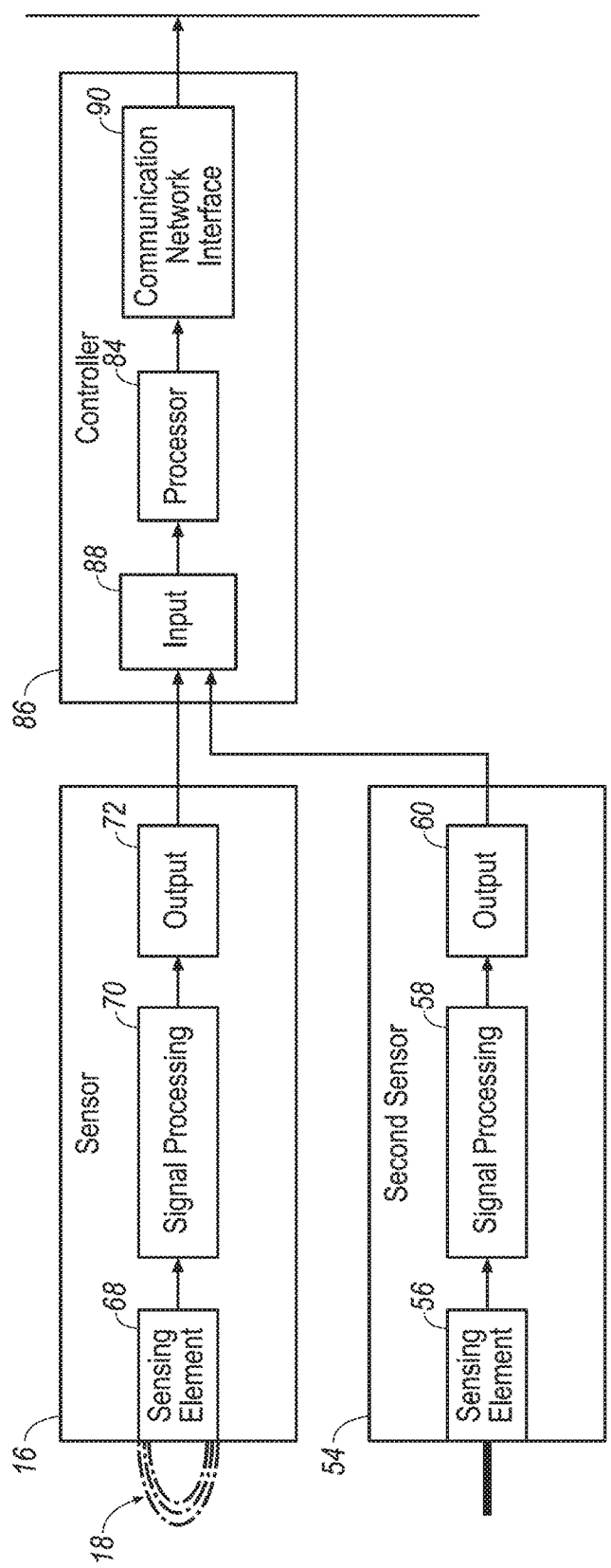
FIG. 5 is a block diagram including the sensor, a second sensor, and a controller.

As shown in FIG. 5, the second sensor 54 may include a sensing element 56, a signal processing 58, and an output 60. The signal processing 58 may be programmable to sense the direction of the movement of the belt 20. The output 60 of the second sensor 54 may report the direction of the movement of the belt 20 as an analog or a digital signal. Alternatively, the output 60 may communicate through a communication network, e.g., Control Area Network (CAN) or Local Interconnect Network (LIN) or any other communication interface.

The webbing 22 of the belt 20 may be formed of a fabric woven as a flat strip. The fabric may be formed of polyester, nylon, or any other material.

As shown in Figures, the markers 24 may be formed of a first material, as described further below, and the belt 20 may have isolating regions formed of a second material different than the first material. The markers 24 may be disposed in an alternating relationship with the isolating regions being disposed in an alternating relationship along the longitudinal length of the webbing 22. In other words, the isolating regions may be fabric material of the webbing 22 disposed between adjacent markers 24.

The markers 24 may be printed on the webbing 22. Alternatively, the markers 24 of the belt 20 may be impregnated inside the webbing 22, woven into the webbing 22, etc. Various technologies may be used to print or impregnate the markers 24. Alternatively the markers 24 may be holes 80 defined in the webbing 22.

The sensor 16 may be positioned to detect the markers 24, as the belt 20 move into or out of the belt retractor 14. The sensor 16 may be supported by the anchor point 44 (as shown in FIG. 2), the belt retractor 14 (as shown in FIG. 6), the pillar 36, or any other suitable position. In the configuration where the sensor 16 is supported by the anchor point 44, the sensor 16 may move with the anchor point 44 relative to the pillar 36. The sensor 16 may be concealed from an occupant compartment of the vehicle 12 by interior trim components (not numbered).

Figure 3:
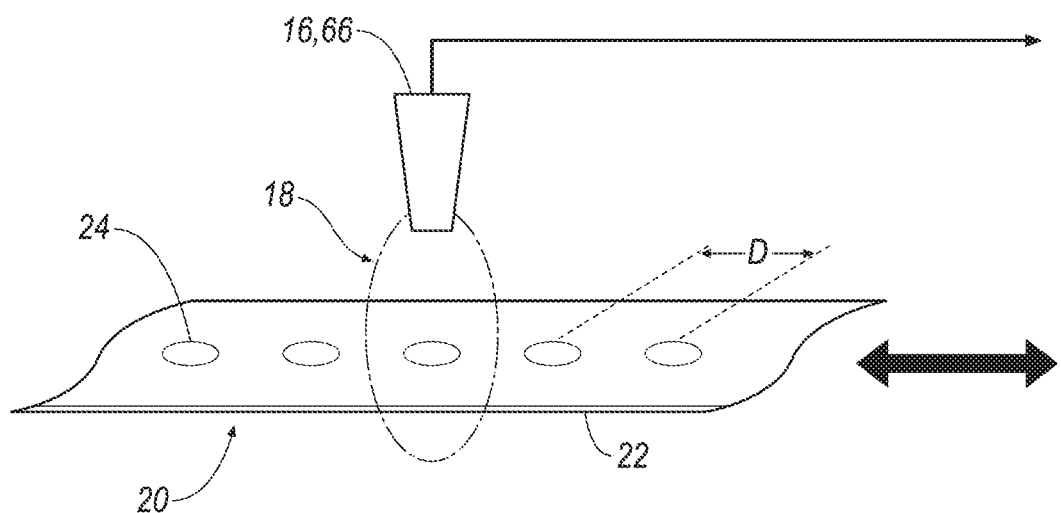
FIG. 3 is the perspective view of a belt and a sensor of the belt assembly.

With continued reference to FIG. 2, the sensor 16 may be a proximity sensor 66 also known as a contactless sensor. With reference to FIGS. 3 and 5, the sensor 16 may include a sensing element 68, a signal processing 70, and an output 72. The proximity sensor may detect the presence of the markers 24 without any physical contact. Additionally, the proximity sensor 66 may detect the size, shape, material or other characteristics of the marker 24. A range in which the proximity sensor 66 may detect the markers 24 is called the detection field 18. The detection field 18 may have a shape as shown in FIGS. 3 and 4 or various other shapes.

As one example, the sensor 16 may be an inductive proximity sensor. The inductive proximity sensor may emit an electromagnetic field and may sense changes in the electromagnetic field induced by the marker 24. In this instance, for example, the markers 24 may be formed of electrically conductive material. For example, the markers 24 may be formed of copper, iron, or any other electrically conductive material.

As another example, the sensor 16 may be a capacitive proximity sensor. The capacitive proximity sensor may rely on differences in dielectric characteristics of the webbing 22 versus the markers 24.

Figure 4A:
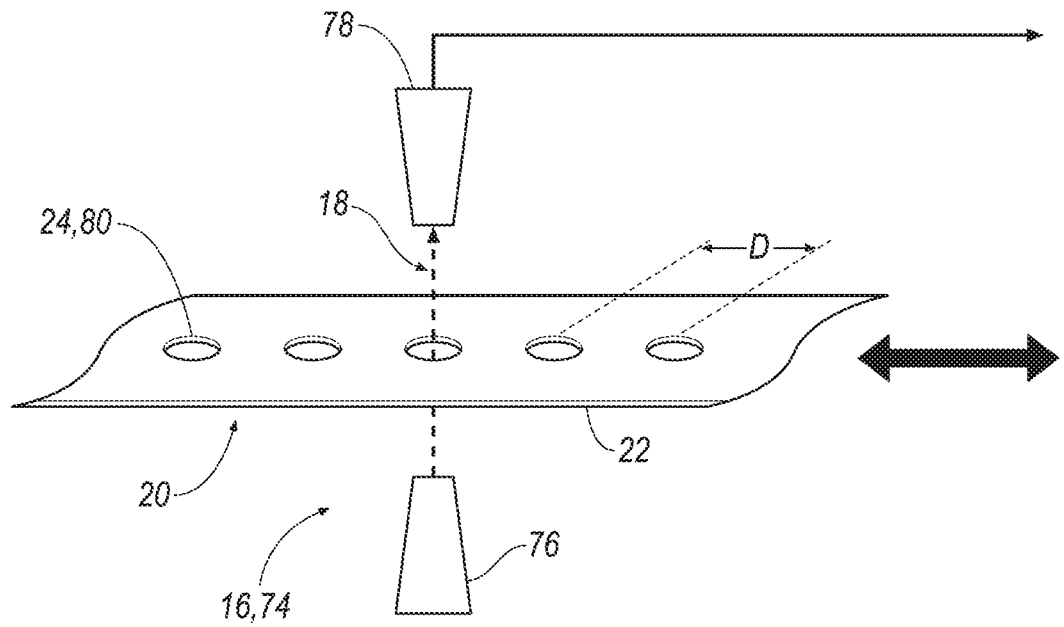
FIG. 4A is a perspective view of a portion of the belt assembly including one embodiment of a marker.
Figure 4B:
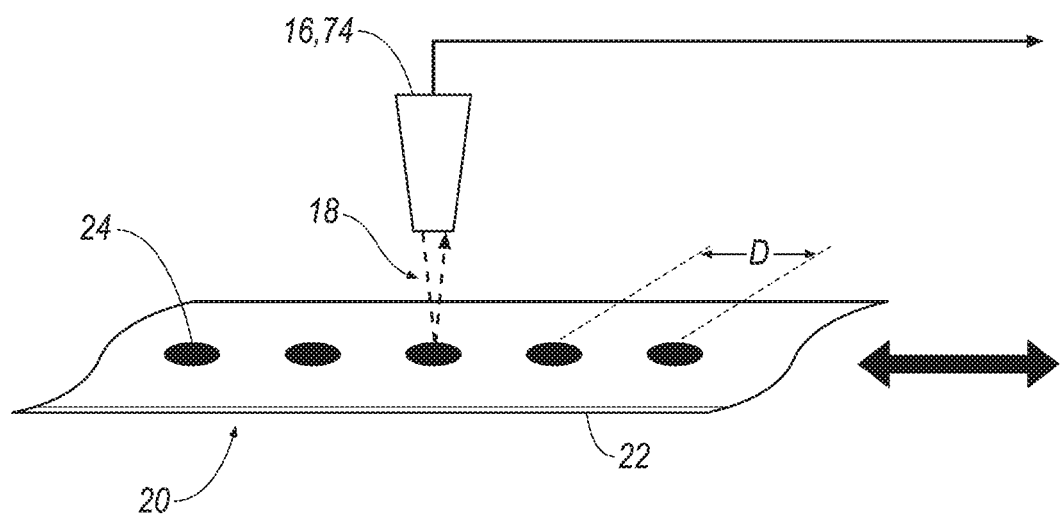
FIG. 4B is a perspective view of a portion of the belt assembly including another embodiment of the marker.

As another example, the sensor 16 may be an optoelectronic proximity sensor 74. The optoelectronic proximity sensor 74 senses the absence or presence of the markers 24 by using a light transmitter 76, e.g., laser or infrared, and a photoelectric receiver 78. As shown in FIG. 4A, the light transmitter 76 may emit light toward the photoelectric receiver 78 and the makers may be holes 80 in the webbing 22. The photoelectric receiver 78 may detect the markers 24, e.g., the holes 80, by sensing a change in the light as the markers 24 pass the photoelectric receiver 78 between the light transmitter 76 and the photoelectric receiver 78. Alternatively, as shown in FIG. 4B, the light transmitter 76 may be adjacent the photoelectric receiver 78. In this configuration, the light transmitter 76 may emit the light toward the webbing 22 and the light is reflected as a reflected beam back to the photoelectric receiver 78. The photoelectric receiver 78 may detect the markers 24 by changes in characteristics of the reflected beam, e.g., the reflective intensity or a wave length of the reflected light from the markers 24 may be different from the reflective intensity or the wave length of the light reflected from the webbing 22.

As shown in FIG. 1, when the belt 20 is fastened, a length of paid out webbing 22 may depend on the size of the occupant 26. For example, the length of the webbing 22 paid out for a larger occupant is longer than the length of the webbing 22 paid out for a smaller occupant, e.g., a child. The length of the webbing 22 paid out may be used to determine the size of the occupant 26. As stated above, the size of the occupant 26 may be used to classify the occupant 26.

The vehicle 12 may include a processor 84 programmed to determine the length of the webbing 22 paid out of the belt retractor 14 based at least on the detection of the markers 24 by the sensor 16. The processor 84 may be embedded in a microcontroller. The microcontroller may include memory, etc. The memory of the microcontroller may store instructions executable by the processor 84 and the processor 84 may read the instructions from the memory and execute the instructions. As shown in FIG. 5, the processor 84 may be integrated in a controller 86, e.g., an electronic control unit, in communication with the sensor 16 through an input 88. Alternatively, the processor 84 may be integrated in the sensor 16. The length of the webbing 22 paid out may be communicated to other controllers, e.g., an airbag controller, through a communication network interface 90 connected to the communication network, e.g., Control Area Network (CAN).

Figure 7:
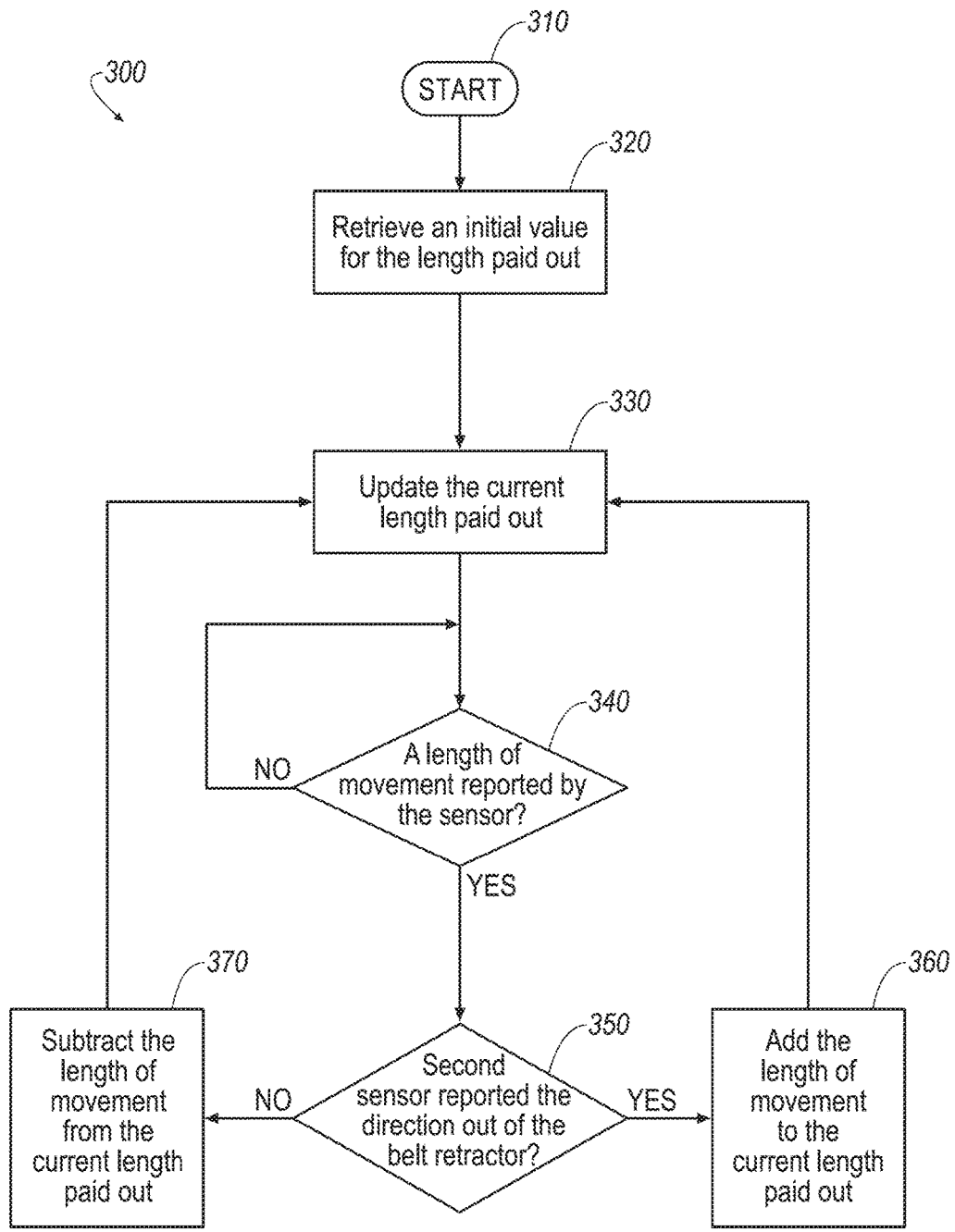
FIG. 7 is a flowchart of a process executed by the belt assembly.

FIG. 7 illustrates a flowchart of an example process 300 that may be executed by the belt assembly 10. The processor 84 may be programmed to execute the process 300. The process 300 may calculate a current length paid out, referring to the current length of the webbing 22 paid out.

With continued reference to FIG. 7, at block 310 the processor 84 may start the execution of the process 300. This may occur at any time such as when a door of the vehicle 12 is opened or the occupant 26 occupies the seat 38. This may assure a change of the length paid out is being captured even when the occupant 26 fastens the belt 20 before an engine start command is executed.

At block 320, the process may retrieve an initial value for the length paid out. This step may also include an adjustment of the initial value based on adjusting the position of the anchor point 44 on the track 48. At block 330, the current length paid out will be updated. This may occur based on the initial value retrieved at block 320 or based on the calculations steps at blocks 360 or 370.

At block 340, the process may recursively wait for reporting a length of the movement by the sensor 16. In response to reporting the length of the movement, the process may verify at block 350 the direction of the movement reported by the second sensor 54. In response to the movement out of the belt retractor 14, the process may proceed to the block 360 and add the length of movement reported by the sensor 16 to the current length paid out, i.e., an increase of the length paid out may be resulted. In response to the movement into the belt retractor 14, the process may proceed to the block 370 and subtract the length of the movement reported by the sensor 16 from the current length paid out, i.e., a decrease of the length paid out may be resulted. The current length paid out will be updated at block 330 based on an outcome of blocks 360 or 370.

Figure 8:
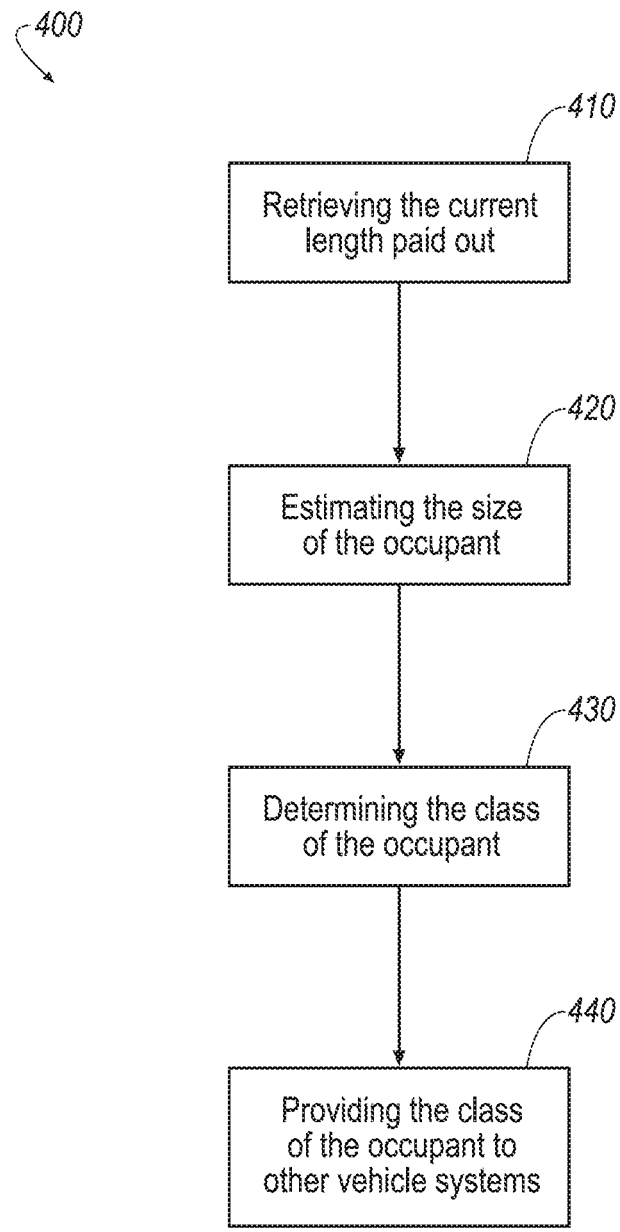
FIG. 8 is a flowchart of a classification process executed by the belt assembly.

FIG. 8 illustrates the example of a classification process 400 that may be executed by the belt assembly 10. The processor 84 may be programmed to execute the classification process 400. The classification process 400 may classify the occupant 26 of the seat 38 in various classes. This information may be used by other systems in the vehicle 12, e.g., to improve the performance of the other systems.

At block 410, the classification process may retrieve the current length paid out that may be calculated by the process 300. At block 420, the size of the occupant 26 may be estimated. This step may also take into account other information provided by any other system in the vehicle 12, e.g., the weight of the occupant 26, and a position of the seat 38. At block 430, the class of the occupant 26 may be determined. The classes may be in form of discrete values, e.g., small, medium, and large. Alternatively, it may be in form of values describing physical characteristics of the occupant 26 like height, waist measurement, etc. At block 440, the classification process may provide the class of the occupant 26 to other vehicle systems, e.g., the airbag controller.

With reference to FIGS. 9-11 there is shown a plus-two-point belt system 100 that acts as a supplemental restraint to the three-point belt system of FIG. 1. As described herein the plus-two-point belt system includes an alert or reminder to the occupant 26 to engage the plus-two-point belt system 100 where the occupant is in the vehicle seat, the ignition is on and the plus-two-point belt 100 is not engaged. The plus-two-point belt system 100 includes a webbing 105 having a first portion 107 and a second portion 109. Webbing 105 is of similar construction to webbing 22. A first end of the webbing 105 is fixed by an anchor 116. Anchor 116 is positioned in the lower portion of the seat 38. The anchor 116 may be, for example, located at a low portion of the seatback. The plus-two-point belt is attached to a belt retractor 120 such that the second portion 109 of the webbing 105 is coiled on the belt retractor 120 when the plus-two-point belt system 100 is not in use. Belt retractor 120 is of similar construction to belt retractor 14.

Unlike the three-point belt assembly 10, plus-two-point belt system 100 does not fasten and unfasten with a buckle. Rather, the occupant 26 slips their arm underneath the webbing 105 of the plus-two-point belt system 100 and pulls the webbing 105 over their shoulder like a backpack. For this reason, plus-two-point belt systems are alternately called backpack systems. When the occupant 26 slips their arm underneath the webbing 105 the webbing 105 pays out from the retractor 120 such that the second portion 109 of the webbing 105 uncoils from the retractor 120 as shown in FIG. 11.

The second portion 109 includes marker 125. The marker 125 is a continuous strip along the second portion 109 of the belt. The marker 125 may be printed on the second portion 109 of webbing 105 or, alternately, the marker 125 may be impregnated inside the second portion 109 of webbing 105. A sensor 130 is positioned proximate retractor 120 and is configured to detect the proximity of a marker 125 when the second portion 109 is uncoiled from the retractor 120. Thus, sensor 130 operates to detect when the plus-two-point belt 100 is in use.

In one example, sensor 130 may be an inductive proximity sensor and in the example the markers may be formed of an electrically conductive material. In another example, the sensor 125 may be a capacitive proximity sensor that would rely on differences in dielectric characteristics of the second portion 109 of webbing 105 as compared to the markers 125. As yet another example the sensor 130 may be an optoelectronic proximity sensor of the type described above.

Figure 12:
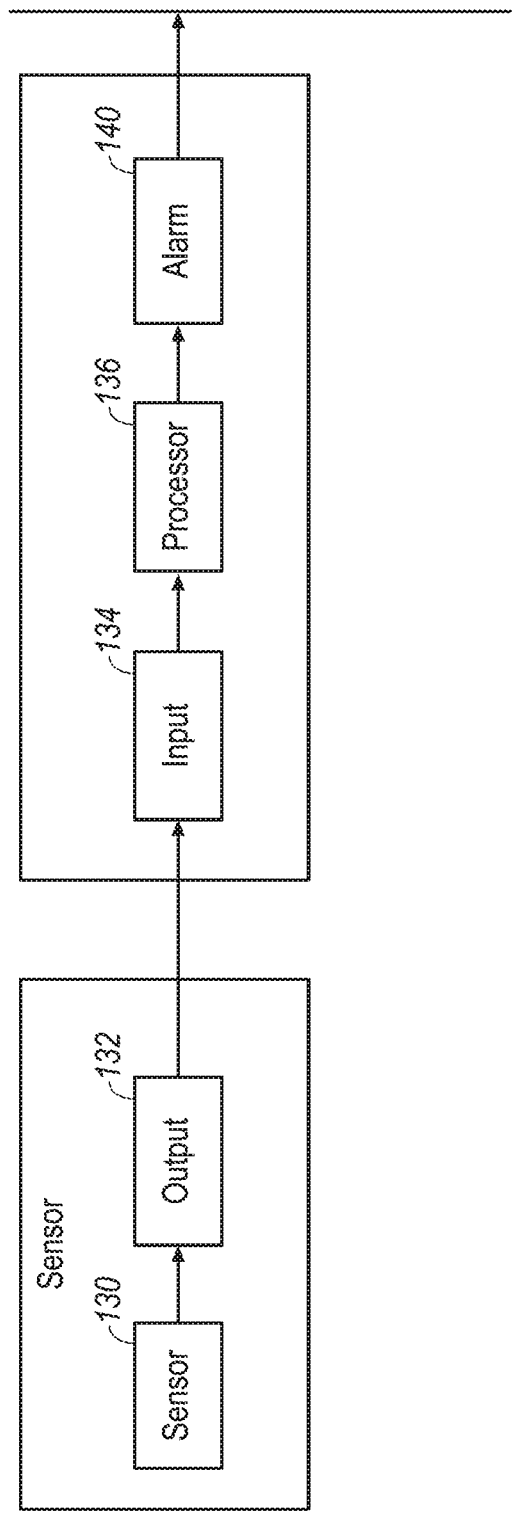
FIG. 12 is a block diagram of sensor including a related controller.

With reference to FIG. 12 there is shown a block diagram including sensor 130 along with an output 132. Output 132 provides an indication of the presence of marker 125. The output 132 may provide an analog or digital signal and may communicate through hard wired communication or through a communication network. Output 132 communicates via an input 134 to a processor 136 which operates the logic set forth in FIG. 13 as described in greater detail below. When occupant is sensed by a seat sensing device, not shown, a processor 136 may signal an alarm 140 that the plus-two-point belt 100 is not engaged. When the sensor 130 detects the presence of the marker 125 it means that the second portion 109 of the webbing 105 has been uncoiled from the retractor 120 thus meaning that the plus-two-point belt 100 is in use.

Figure 13:
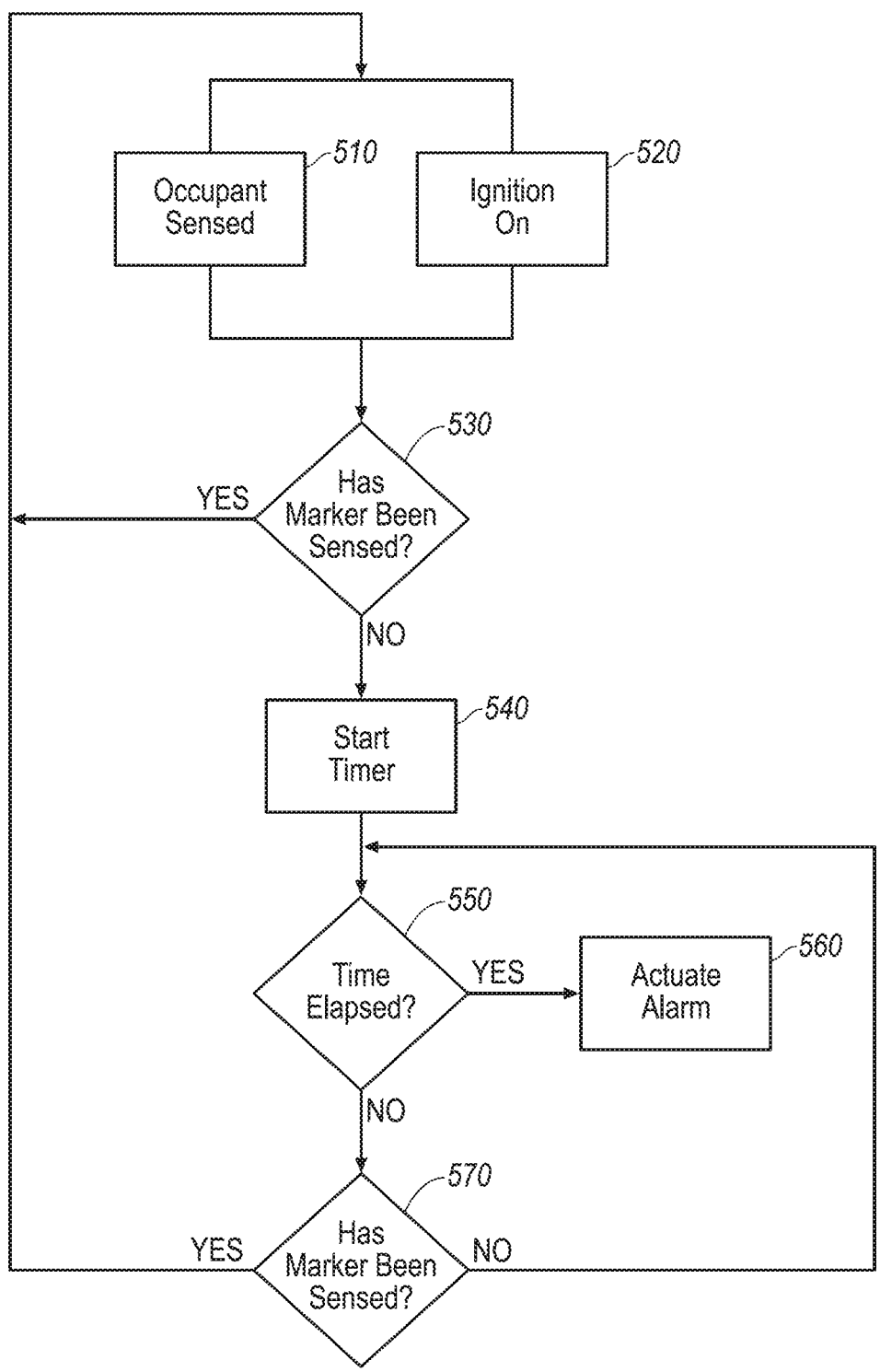
FIG. 13 is a flow chart of a plus-two-point belt reminder system.

With reference to FIG. 13 there is a flow diagram of a plus-two-point belt alarm process flow undertaken by processor 136. The process flow begins at blocks 510 and 520 where the processor 136 detects the presence of the occupant 26 at block 510 and that the ignition of the vehicle is on at block 520. The occupant signal at block 510 and ignition on signal at block 520 are available from vehicle systems as is known in the art. At block 530 the processor 136 queries whether the marker 125 has been sensed. Where the marker 125 has been sensed the processor 136 continues to monitor the sensor 130 so long as the vehicle is in its ignition on positon at block 520 and the occupant is sensed at block 510. Where the processor does not sense the marker 125 at block 530, the processor 136 sets a timer at block 540. One example time period is five seconds. At block 550 the processor 136 will determine if the time set at block 540 has expired. Where the time has expired, and the marker 125 has not been sensed, the processor will actuate an alarm at block 560. The alarm actuated at 560 may be audible or visual or both. During the period of time where the processor 136 is counting down the timer the processor will continue to monitor the sensor 130 to determine whether the marker 125 has been sensed at block 570. If the marker 125 has been sensed before the expiration of time at block 570 the processor will again return to the query as to whether the occupant has been sensed, at block 510, and the ignition is on, at block 520.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An occupant restraint system comprising:
a plus-two-point belt having longitudinal first webbing anchored at a first end to a seat and fixed at a second end to a plus-two retractor; the first webbing including first and second portions, wherein the second portion is retractably coiled on the plus-two retractor; the second portion having at least one conductive plus-two marker,
a plus-two sensor positioned adjacent the second end of the first webbing and configured to sense the plus-two marker;
a releasably lockable belt assembly having a second webbing with a plurality of markers being equally spaced along the second webbing;
means for actuating an alarm when the plus-two marker in the first webbing is not detected; and
means for determining the length of the second webbing paid out to classify an occupant in the seat.

2. The occupant restraint system as in claim 1 wherein the plus-two marker is a continuous elongate metallic member positioned in the second portion.

3. The system as in claim 1 wherein the plus-two marker is a conductive metal coating.

4. The system as in claim 3 wherein the metal coating is impregnated into the first webbing.

5. The system as in claim 1 wherein the plus-two sensor is a proximity sensor.

6. The system as in claim 5 wherein the plus-two sensor is an optical sensor.

7. The system as in claim 1 wherein the plus-two sensor is an inductive sensor.

8. The system as in claim 7 wherein the alarm is audible.

9. The system as in claim 1 wherein the plus-two sensor is mounted underneath the retractor.

10. The system as in claim 1 wherein the alarm is signaled when the plus-two marker is not detected over a predetermined time threshold.

11. A method for estimating the size of an occupant and for determining whether a plus-two-point belt system is engaged, a plus-two-point belt having a first webbing anchored at a first end and coiled on a retractor at a second end, and a releasably lockable belt assembly; the releasably lockable belt assembly including a second webbing with a plurality of equally spaced markers; the method comprising:
determining whether an occupant is in a seat and an ignition of a vehicle occupied by the occupant is in an on position; and
sensing with a sensor proximate the retractor a plus-two marker in a second portion of the first webbing,
a step for actuating an alarm when the plus-two marker is not sensed,
a step for determining the length of the second webbing paid out, and
a step for estimating the size of the occupant in the seat based on the length of the second webbing paid out.

12. The method as in claim 11 further comprising actuating a timer when the plus-two marker is not sensed.

13. The method as in claim 12 where an alarm is not actuated if the plus-two marker is sensed before the timer expires.

14. The method as in claim 13 where the timer is set for 5 seconds.

15. The method as in claim 11 further comprising detecting that the ignition is on prior to detecting the presence of the plus-two marker.

16. The method as in claim 11 wherein the alarm is audible.

* * * * *